(12) United States Patent
Lucchetta et al.

(10) Patent No.: US 10,808,713 B2
(45) Date of Patent: Oct. 20, 2020

(54) BEARING SUPPORT FOR A VACUUM PUMP

(71) Applicant: Edwards Limited, Burgess Hill, West Sussex (GB)

(72) Inventors: Emiliano Lucchetta, Burgess Hill (GB); Reuben Day, Burgess Hill (GB)

(73) Assignee: Edwards Limited, Burgess Hill, West Sussex (GB)

( * ) Notice: Subject to any disclaimer, the term of this patent is extended or adjusted under 35 U.S.C. 154(b) by 0 days.

(21) Appl. No.: 16/468,975

(22) PCT Filed: Dec. 14, 2017

(86) PCT No.: PCT/GB2017/053739
§ 371 (c)(1),
(2) Date: Jun. 12, 2019

(87) PCT Pub. No.: WO2018/109474
PCT Pub. Date: Jun. 21, 2018

(65) Prior Publication Data
US 2019/0383299 A1 Dec. 19, 2019

(30) Foreign Application Priority Data
Dec. 15, 2016 (GB) .................................. 1621361.3

(51) Int. Cl.
*F16C 27/06* (2006.01)
*F04D 29/059* (2006.01)
(Continued)

(52) U.S. Cl.
CPC ......... *F04D 29/059* (2013.01); *F04D 19/042* (2013.01); *F16C 27/04* (2013.01);
(Continued)

(58) Field of Classification Search
CPC ... F16C 27/066; F16C 35/077; F16C 2360/45
See application file for complete search history.

(56) References Cited

U.S. PATENT DOCUMENTS

| 2,874,008 A | 2/1959 | Corte et al. |
| 3,743,365 A * | 7/1973 | Kato ..................... F16C 27/066 384/536 |

(Continued)

FOREIGN PATENT DOCUMENTS

| DE | 3908965 A1 | 9/1990 |
| DE | 4139923 A1 | 7/1992 |

(Continued)

OTHER PUBLICATIONS

British Search Report dated Jun. 6, 2017 and Examination Report dated Jun. 7, 2017 for corresponding British Application No. GB1621361.3.

(Continued)

*Primary Examiner* — Phillip A Johnson
(74) *Attorney, Agent, or Firm* — Theodore M. Magee; Westman, Champlin & Koehler, P.A.

(57) ABSTRACT

This is invention relates to a bearing support for a vacuum pump and, in particular, to a polymer bearing support for a vacuum pump. The invention further encompasses vacuum pumps comprising polymer bearing supports, and methods of manufacturing bearing supports.

14 Claims, 3 Drawing Sheets

(51) Int. Cl.
*F04D 19/04* (2006.01)
*F16C 27/04* (2006.01)
(52) U.S. Cl.
CPC ........ *F16C 27/066* (2013.01); *F05B 2240/50* (2013.01); *F05B 2260/964* (2013.01); *F05B 2280/4009* (2013.01); *F16C 2208/36* (2013.01); *F16C 2360/45* (2013.01)

(56) References Cited

U.S. PATENT DOCUMENTS

| | | | | |
|---|---|---|---|---|
| 5,033,875 | A | * | 7/1991 | Moulinet ............... F16C 27/063 |
| | | | | 384/536 |
| 5,314,255 | A | | 5/1994 | Schwerdt |
| 5,425,584 | A | | 6/1995 | Ide |
| 5,501,531 | A | | 3/1996 | Hamaekers |
| 5,513,917 | A | | 5/1996 | Ide et al. |
| 5,547,174 | A | * | 8/1996 | Bade ...................... B60K 17/24 |
| | | | | 267/154 |
| 6,149,382 | A | | 11/2000 | Englander et al. |
| 2002/0172442 | A1 | | 11/2002 | Bade et al. |
| 2007/0182257 | A1 | | 8/2007 | Miura et al. |
| 2009/0214145 | A1 | | 8/2009 | Cislo et al. |
| 2013/0121858 | A1 | * | 5/2013 | Sekita ................... F04D 29/059 |
| | | | | 417/423.12 |
| 2014/0154072 | A1 | * | 6/2014 | Quartarone ........... F04D 19/042 |
| | | | | 415/229 |
| 2014/0185970 | A1 | | 7/2014 | Kim |
| 2015/0016763 | A1 | * | 1/2015 | Stoinski ................ F16C 35/077 |
| | | | | 384/536 |

FOREIGN PATENT DOCUMENTS

| | | |
|---|---|---|
| JP | 2006200670 A | 8/2006 |
| WO | 8809443 A1 | 12/1988 |
| WO | 9322575 A1 | 11/1993 |
| WO | 2006131694 A1 | 12/2006 |

OTHER PUBLICATIONS

PCT International Search Report dated Mar. 1, 2018 for corresponding PCT Application No. PCT/GB2017/053739.
PCT International Written Opinion dated Mar. 1, 2018 for corresponding PCT Application No. PCT/GB2017/053739.
First Office Action dated Apr. 1, 2020 for corresponding Chinese Application No. 201780078056.0.
Chinese Search Report for corresponding Chinese Application No. 201780078056.0 dated Mar. 25, 2020.

* cited by examiner

BEARING SUPPORT FOR A VACUUM PUMP

CROSS-REFERENCE OF RELATED APPLICATION

This application is a Section 371 National Stage Application of International Application No. PCT/GB2017/053739, filed Dec. 14, 2017, and published as WO 2018/109474 A1 on Jun. 21, 2018, the content of which is hereby incorporated by reference in its entirety and which claims priority of British Application No. 1621361.3, filed Dec. 15, 2016.

FIELD

The invention relates to a bearing support for a vacuum pump and, in particular, to a polymer bearing support for a vacuum pump. The invention further encompasses vacuum pumps comprising polymer bearing supports, and methods of manufacturing bearing supports. The invention is of particular use for supporting rotor bearings in turbomolecular pumps, in particular rolling bearings.

BACKGROUND

Vacuum pumps typically comprise an impeller in the form of a rotor mounted on a shaft for rotation relative to a surrounding stator. The shaft is supported by a bearing arrangement comprising two bearings located at or intermediate respective ends of the shaft. One or both of these bearings may be in the form of rolling bearings. For instance, the upper bearing may be in the form of a magnetic bearing, and the lower bearing is in the form of a rolling bearing.

As illustrated in FIG. 1, a typical rolling bearing 10 comprises an inner race 12 fixed relative to shaft 14 of the pump, an outer race 16, and a plurality of rolling elements 18, supported by a cage 20, for allowing relative rotation of the inner race 12 and the outer race 16. The rolling bearing 10 is lubricated to establish a load-carrying film separating the bearing components in rolling and sliding contact in order to minimize friction and wear, and shield elements 22 are provided to resist seepage of lubricant out of the rolling bearing 10.

Traditionally, the mounting arrangement for supporting the rolling bearing 10 within the pump comprised a radial elastomeric damping ring 24 positioned radially between the outer race 16 and a housing portion 26 for damping radial movement of the outer race 16, and an axial elastomeric damping ring 28 positioned between an end face of the outer race 16 and the housing portion 26 for damping axial movement of the outer race 16.

There are a number of problems associated with use of radial and axial elastomeric damping rings 24, 28 for attenuating vibrations within a vacuum pump. For instance, the axial and radial stiffness are coupled and so the requirement for high axial stiffness conflicts with the requirements of low radial stiffness. Over a period of time elastomeric material may suffer from creep and stress relaxation under load. Elastomeric material also softens due to interaction with any lubricant discharged from the bearing. Furthermore, the stiffness characteristics of elastomeric material are highly non-linear, and change markedly with time, temperature and interaction with lubricant, and so there is currently no accurate analytical model for predicting the stiffness and damping characteristics of the rings during use. Additionally, bearing replacement is not straightforward, making field replacement difficult unless a separate cartridge is introduced.

More recently, metallic bearing supports have been employed in vacuum pumps. FIGS. 2 and 3 show an example of such a metallic support 32 comprising inner 29 and outer 31 annular portions connected by a plurality of flexible members 30. Metallic bearing supports address a number of the problems associated with elastomeric damping rings; however, they also present a number of specific technical challenges associated with their use.

Metallic bearing supports are typically manufactured using wire erosion which is time consuming and expensive to perform. Due to manufacturing tolerances, there is a lower limit to the thickness of the flexible beams that can be produced, which, in turn, places a lower limit on the radial flexibility of the support. Additionally, high elastic contact forces and resultant deformation mean that the bearing cannot be press-fit inside the device. Instead the bearing must be bonded in place and/or secured with additional locking mechanisms, for instance using a lock-nut. Furthermore, metallic bearing supports provide substantially no damping and so separate dampers are routinely employed. It has been observed that elastomeric dampers may undesirably increase the radial stiffness of the metallic support, reducing the support's performance still further.

The present invention addresses these and other problems with the prior art.

The discussion above is merely provided for general background information and is not intended to be used as an aid in determining the scope of the claimed subject matter. The claimed subject matter is not limited to implementations that solve any or all disadvantages noted in the background.

SUMMARY

Accordingly, in a first aspect the present invention provides a polymer bearing support for use in the resilient support of a rotor bearing of a vacuum pump in both radial and axial directions. The bearing support may comprise an inner portion configured to be coupled to the bearing and an outer portion configured to be coupled to a housing of the vacuum pump. The inner and outer portions may be connected by at least one flexible member. Typically, the bearing support is a single unitary structure. Preferably, the bearing support comprises a single piece of polymer.

Polymer bearing supports advantageously address the problems associated with metallic bearing supports. They may be cheap to produce, at least partially self-damping, and because of their lower tensile modulus may be press-fit on the bearing without distorting its outer race.

Typically, the polymer support has a radial stiffness in the range from about 50 N/mm to about 500 N/mm, preferably less than about 300 N/mm, more preferably less than about 250 N/mm, more preferably less than about 220 N/mm. The resilient support can thus be designed with a very low radial stiffness to meet the required rotor dynamics of the vacuum pump.

Typically, the polymer support has an axial stiffness greater than about 300 N/mm, more preferably greater than about 350 N/mm, more preferably from about 300 N/mm to about 1000 N/mm. Accordingly, when the support is employed in a vacuum pump there is minimal axial movement of the drive shaft during operation of the pump, thus enabling the tight axial clearance between the components of the pumping mechanism to be substantially maintained during operation of the pump.

Preferably the axial stiffness is greater than the radial stiffness.

Preferably the radial stiffness of polymer bearing supports according to the invention is substantially isotropic, preferably the radial stiffness varies by less than about 2%, more preferably less than about 1%, more preferably less than about 0.5% in any radial direction. For the purpose of the invention, in non-annular embodiments radial stiffness includes transverse stiffness.

In embodiments of the invention one of the inner portion and outer portions is annular, more typically both of the outer and inner portions are annular. The flexible member may be in an elongate, arcuate member substantially concentric with the inner annular portion and/or outer annular portion.

The flexible member may itself be annular and, preferably, joined by at least one first radial beam to the inner portion and at least one second radial beam to the outer portion. Preferably, the inner portion is joined to the at least one annular flexible member by two, three, four, five or more radial beams. Likewise, the outer portion is preferably joined to the annular flexible member by two, three, four, five or more radial beams. The beams connected to the outer portion may be circumferentially offset with the beams connected to the inner portion, preferably the beams are alternately connected to the inner and outer portions. Typically, the number and arrangement of the beams are selected so that the radial stiffness of the support is substantially isotropic. More than one annular flexible member may be used, each concentric with the inner and outer portions.

Typically, the axially aligned faces of the beams are radiused, preferably to form concave surfaces. Advantageously this arrangement reduces undesirable stress concentrations where the beams intersect the annular members and flexible member respectively.

Such bearing supports are cheap and straightforward to machine, mould or extrude, and provide improved performance compared to metallic support members.

Preferably, the flexible member has a transverse, e.g. radial, thickness of from about 0.1 mm to about 1 mm, preferably from about 0.3 mm to about 0.7 mm.

Preferably the beams have a radial length of from about 0.5 mm to about 3 mm. Typically, they have a thickness of from about 0.2 mm to about 1.5 mm. Typically, the inner beams and outer beams are of substantially the same length and/or thickness.

Accordingly, the support may comprise part-annular slots located between the annular members and the flexible member. Typically, the slots may have a thickness of from about 0.5 mm to about 3 mm.

The axial length of beams, annular and flexible members are substantially the same. Typically, their axial length is from about 2 mm to about 10 mm.

In embodiments, the supports of the invention may be used on new turbomolecular pumps or retrofitted to turbomolecular pumps to replace an existing metallic bearing support.

Preferably the polymer support is moulded, extruded, printed, machined, cast or spin cast, or combinations thereof. Injection moulding, extrusion, spin casting, laser microjet machining and micro waterjet machining are particularly preferred methods for forming the polymer support.

Preferred polymers are selected from group consisting of elastomers, thermoplastic materials or thermosets. Thermoplastic materials are preferred and in particular those classified as high performance thermoplastic materials due to their mechanical and thermal properties. Suitable thermoplastic polymers include polyether ether ketone (PEEK), polysulfone (PSU), polyethersulfone (PES), polyvinylidene fluoride (PVDF), polyetherimide (PEI), polyphenylene sulphide (PPS), styrenebutadien copolymers (SBC), polyketone (PK), and derivatives and copolymers thereof. PEEK is particularly preferred.

The polymers may additionally include one or more from the group consisting of anti-statics, antioxidants, mould release agents, flame-proofing agents, lubricants, colorants, flow enhancers, fillers, including nanofillers, light stabilizers and ultraviolet light absorbers, pigments, anti-weathering agents and plasticizers.

Injection moulding may advantageously be used to direct or align fibres within the polymer support member.

Additionally, or alternatively, the polymer may be a polymer matrix composite. Preferably, the polymer matrix accounts for at least about 50 wt % of the composite, more preferably from about 60 wt % to about 80 wt %. The polymer matrix composites may for instance be glass fibre or carbon fibre reinforced polymers, or metal powder reinforced polymers. Glass fibre reinforced polymers, such as glass fibre reinforced PEEK are particularly preferred. Preferably the fibre content is from about 10 wt % to about 50 wt %, preferably from about 20 wt % to about 40 wt %, preferably from about 25 wt % to about 35 wt %. Preferably, the composite can be moulded, additive manufactured, machined or extruded.

Preferably, the support comprises a polymer with a tensile modulus of less than about 50 GPa, preferably from about 2 GPa to about 25 GPa, more preferably from about 3 GPa to about 10 GPa, more preferably from about 3 GPa to about 5 GPa. In contrast, titanium, which is commonly used in vacuum pump bearing supports, has a tensile modulus of from about 100 GPa to about 125 GPa.

The lower tensile moduli of polymers used in the invention advantageously allow the production of bearing supports with lower radial stiffness and which can be press-fit in place; thereby avoiding the need for a locknut and/or a bonding step during manufacture. In contrast, because of titanium's high tensile modulus, known titanium supports cannot be press-fit to the bearing because the contact stress with the bearing's steel case would be too high, risking distortion of the outer race.

Preferably, the support comprises a polymer with a yield strengths of at least about 85 MPa, more preferably at least about 95 MPa. The polymer may have a yield strength of from about 85 MPa to about 500 MPa, preferably from about 95 MPa to about 200 MPa.

In embodiments, preferably the support comprises a material wherein the ratio $\sigma UTS/(E^{2/3})$ is greater than about 0.3, preferably greater than about 0.35, preferably from about 0.25 to about 0.5, more preferably from about 0.3 to about 0.4. Wherein $\sigma UTS$ is the ultimate tensile strength in MPa, and wherein E is the Tensile Modulus expressed in MPa.

Advantageously the tensile and flexural properties of the bearing support do not significantly deteriorate at the operating temperature of the bearing support. Typically, the operating temperature is about 90° C. Preferably, the support comprises a polymer with a glass transition temperature ≥100° C., more preferably ≥110° C., more preferably ≥120° C., more preferably ≥140° C., more preferably between about 100° C. and about 240° C., more preferably between about 110° C. and about 230° C.

Preferably the polymer has a tensile strength of at least about 60 MPa at 90° C.

When at full speed the rotor of a turbomolecular pump will vibrate by a matter of microns; however, during start-up and shut-down procedures, at the beginning and end of pump cycles, the rotor will pass through a series of resonances. Typically, the displacement during the resonances is limited to between about 80 microns and about 120 microns, preferably approximately 100 microns.

Preferably the fatigue strength of the polymer at $10^7$ cycles is greater than about 45 MPa, more preferably greater than about 55 MPa.

Preferably the polymer has a creep rupture strength at 150° C. for 1E+6 s which is greater than about 15 MPa, preferably greater than about 25 MPa. Additionally, or alternatively, the creep rupture strength at 23° C. for 1E+8 s may be greater than about 60 MPa, preferably greater than about 80 MPa.

In further aspect the invention provides polymer bearing support for use in the resilient support of a rotor bearing of a vacuum pump in both radial and axial directions, the bearing support comprising inner and outer annular portions and at least one intermediate annular portion joined to the inner portion by at least one first radial beam and joined to the outer portion by at least one second radial beam.

In a further aspect the invention provides a vacuum pump comprising a rotor supported by a bearing arrangement, the bearing arrangement comprising a bearing supported in both radial and axial directions by a polymer support according to any other aspect or embodiment of the invention.

The invention further provides a vacuum pump comprising a rotor supported by a bearing arrangement, the bearing arrangement comprising a bearing supported in both radial and axial directions by a resilient polymer support comprising inner and outer annular portions connected by at least one flexible member.

The invention further provides the use of a polymer, in particular PEEK, polysulfone (PSU), polyethersulfone (PES), polyvinylidene fluoride (PVDF), polyetherimide (PEI), polyphenylene sulphide (PPS), styrenebutadien copolymers (SBC), polyketone (PK), and derivatives and copolymers thereof, in a resilient support comprising inner and outer portions connected by at least one flexible member to resiliently support a rotor bearing in a vacuum pump in both radial and axial directions.

The invention further provides a method of manufacturing a resilient polymer bearing support comprising the steps of moulding, extruding, printing or machining a polymer to form the support, the support comprising an inner portion configured to be coupled to the bearing and an outer portion configured to be coupled to a housing of the vacuum pump, wherein the inner and outer portions are connected by at least one flexible member.

The invention further provides a method of assembling a vacuum pump comprising a bearing support, the method comprising the steps of removing a bearing support and replacing the bearing support with a polymer bearing support, preferably a bearing support according to one or more of the other aspects of the invention. The bearing support that is replaced may be a metallic bearing support or a bearing support according to the invention.

Typically, the outer dimensions of the replacement polymer bearing support are substantially the same as those of the metallic bearing support. For instance, advantageously, the circumference of the inner wall of the inner annular portion of the polymer and metallic bearing supports are substantially the same, and/or the circumference of the outer wall of the outer annular portion of the polymer and metallic bearing supports are substantially the same, and/or the axial length of the polymer and metallic bearing supports are substantially the same.

For the avoidance of doubt, all aspects and embodiments described hereinbefore may be combined mutatis mutandis.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

BRIEF DESCRIPTION OF THE FIGURES

Preferred features of the present invention will now be described, by way of example, with reference to the accompanying drawings, in which.

DETAILED DESCRIPTION

The invention provides a polymer bearing support 36 for use in the resilient support of a rotor bearing of a vacuum pump in both radial and axial directions.

Figure 1:
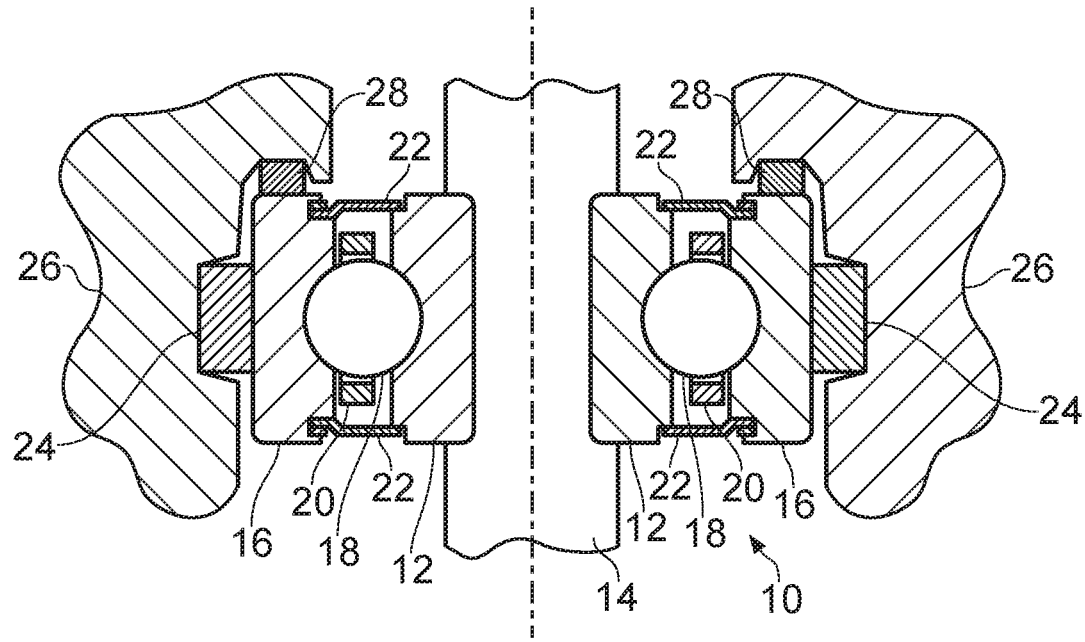
FIG. 1 shows a prior art bearing support.
Figure 2:
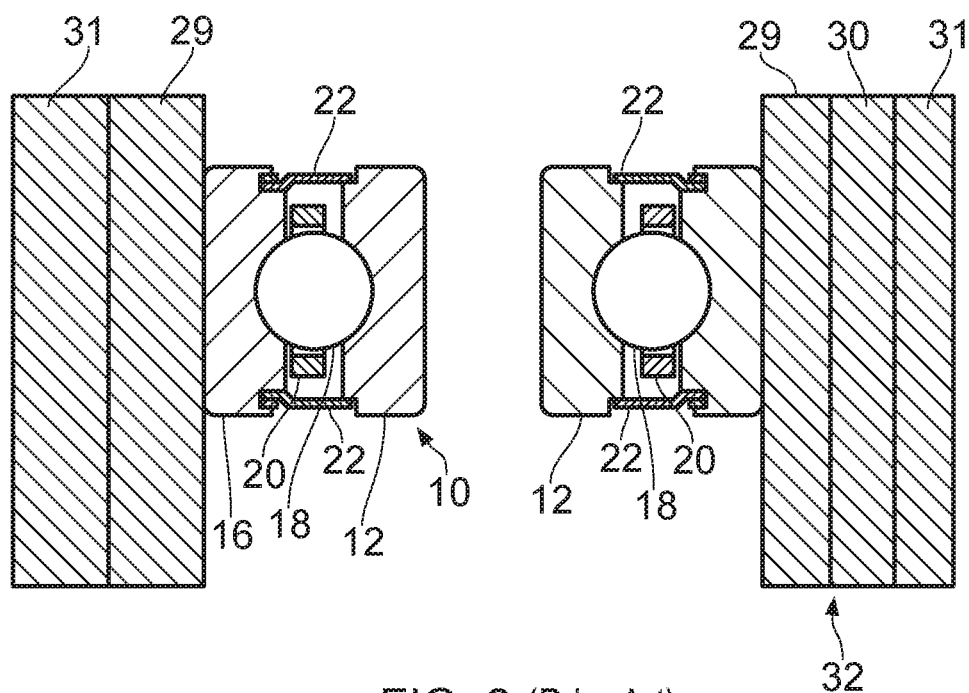
FIG. 2 shows a prior art bearing support.
Figure 3:
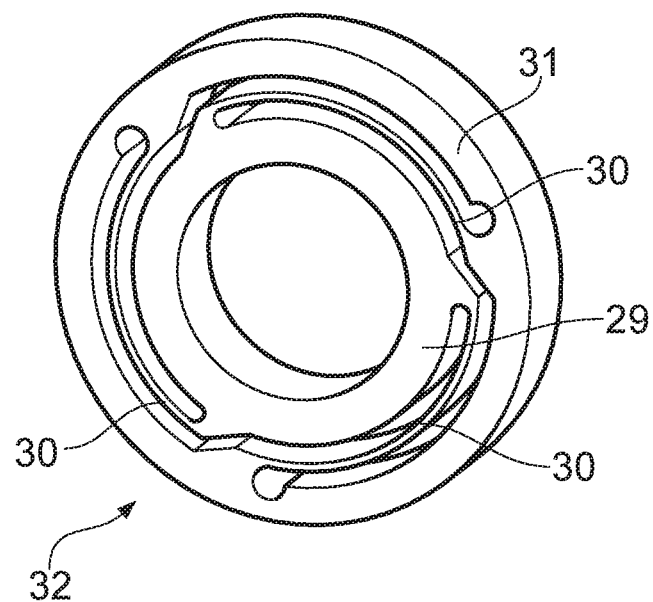
FIG. 3 shows a prior art bearing support.
Figure 4:
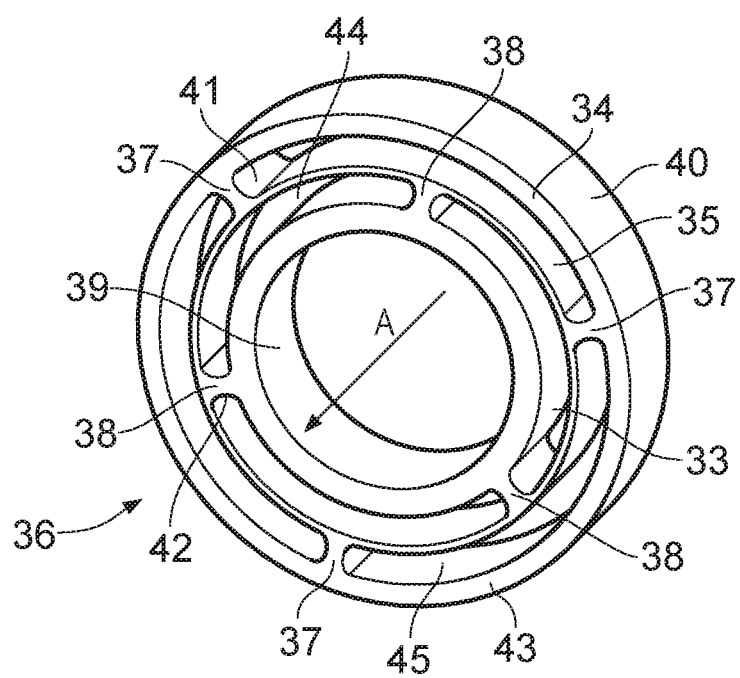
FIG. 4 shows a polymer bearing support according to the invention.

As illustrated in FIG. 4, in an example, the at least one flexible member 35 is annular and substantially concentric with the inner 33 and outer 34 annular portions about an axis A. The exemplified flexible member 35 has a radial thickness of 0.4 mm, and is joined to the inner portion 33 by three radial beams 38 and to the outer portion 34 by a further three radial beams 37. The radial beams 37, 38 are circumferentially alternately connected to the inner 33 and outer 34 portions and substantially equidistantly arranged. Accordingly, the flexible member 35 of the resilient support provides an integral leaf spring of the resilient support 36. The radial stiffness of the exemplified bearing support 36 has been found to be substantially isotropic.

The axially aligned faces 41, 42 of the beams are concave surfaces to reduce stress concentrations where the beams 37, 38 intersect the annular 33, 34 and flexible 35 members.

The inner portion 33 of the resilient support 36 has an inner, axially extending cylindrical surface 39 engaging the outer surface of the outer race of the rolling bearing (not shown).

In use the end surface 43 engages a radially extending surface of the molecular pump housing (not shown), whilst the outer, axially extending cylindrical surface 40 of the outer portion 34 of the resilient support 36 engages an axially extending surface of the housing (not shown).

The resilient support 36 is machined from a moulded polymer disk of PEEK: for instance VICTREX® PEEK 450G. The stiffness of the resilient support 36 is determined by the geometry of the slots 44, 45, beams 37, 38 and flexible member 35, and can be accurately estimated using finite element analysis. It has been found that the resilient support 36 can be readily designed to have a relatively low radial stiffness, for example in the range from 50 to 300 N/mm, and preferably around 220 N/mm, for inhibiting the transmission of vibrations from the shaft of the turbomolecular pump impeller to the housing.

The resilient support 36 may also have a relatively high axial stiffness, for example in the range from 300 to 10,000 N/mm, preferably in the range from 300 to 1000 N/mm and more preferably in the range from 300 to 800 N/mm, so that there is minimal axial movement of the shaft during operation of the pump.

Figure 5A:
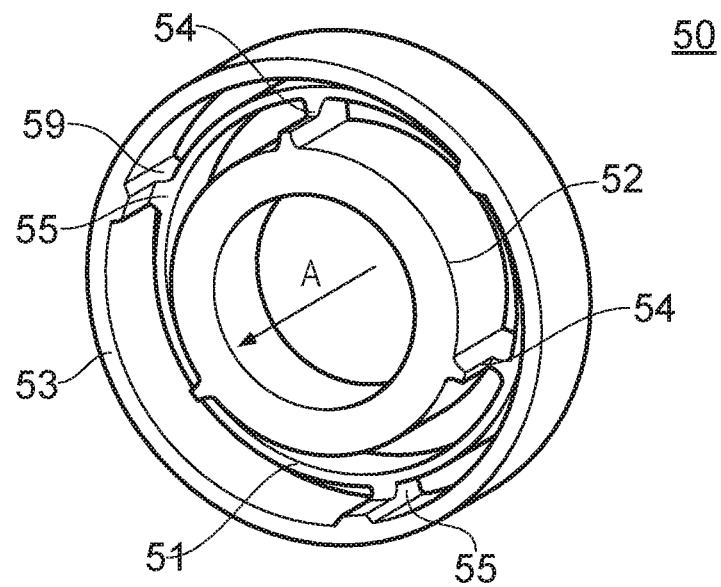
FIGS. 5a and 5b show a polymer bearing support according to the invention.
Figure 5B:
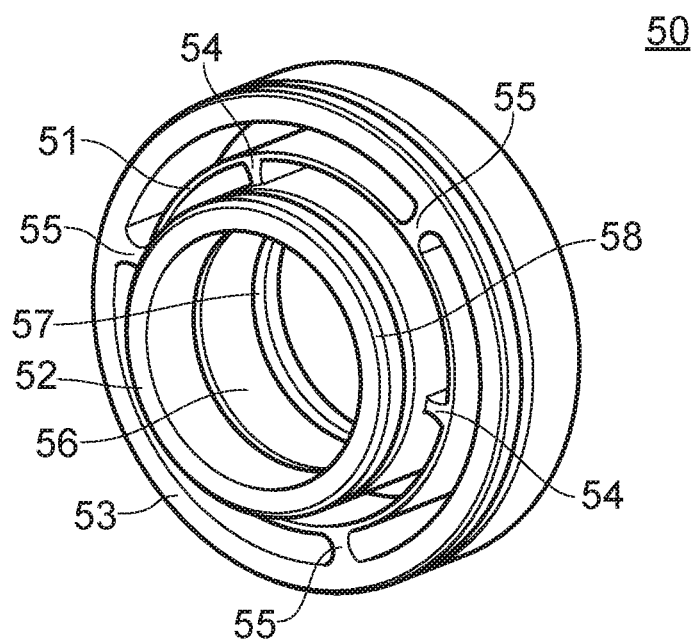

FIGS. 5a and 5b show an alternative example of the invention. FIG. 5a shows the pump end (or top) of the bearing support 50. FIG. 5b shows the underside of the same bearing support 50.

In the alternative example, the at least one flexible member 51 is annular and substantially concentric with the inner 52 and outer 53 annular portions about an axis A. The exemplified flexible member 51 has a radial thickness of 0.4 mm, and is joined to the inner portion 52 by three radial beams 54 and to the outer portion 53 by a further three radial beams 55. The radial beams 54, 55 are circumferentially alternately connected to the inner 52 and outer 53 portions and substantially equidistantly arranged. Accordingly, the flexible member 51 of the resilient support provides an integral leaf spring of the resilient support 50. The radial stiffness of the exemplified bearing support 50 has again been found to be substantially isotropic.

The resilient support is either injection moulded from PEEK (for instance VICTREX® PEEK 450G) or machined from extruded PEEK (for instance Tecapeek Natural).

The inner portion 52 of the resilient support 50 has an inner, axially extending cylindrical surface 56 engaging the outer surface of the outer race of the rolling bearing (not shown) in an interference fit. A portion of the pump-end of the bearing engages with an integrally formed radially inwardly extending shoulder (57) of the inner portion (52).

A threaded boss (58) is located on the outer portion (53) which provides a reversible mechanical engagement with the pump (not shown). An axial stop (not shown) may be bonded to the inner portion (52) behind the bearing. This is advantageous in embodiments where an interference fit cannot be solely relied upon or is insufficient to hold the bearing in place.

The bearing support 50 further comprises a substantially annular groove 59 for optionally receiving an elastomeric damping member (not shown). The elastomeric damping member may be an O-ring or other suitable shape for coupling with the groove 59. A skilled person may judge whether an elastomeric damping member is required.

It will be appreciated that various modifications may be made to the embodiments shown without departing from the spirit and scope of the invention as defined by the accompanying claims as interpreted under patent law.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A polymer bearing support for use in the resilient support of a rotor bearing of a vacuum pump in both radial and axial directions, the bearing support comprising an inner portion configured to be coupled to the bearing and an outer portion configured to be coupled to a housing of the vacuum pump, wherein the inner and outer portions are connected by at least one flexible member, wherein said at least one flexible member is an elongate, arcuate member substantially concentric with the inner portion and outer portion and the flexible member is annular and joined by at least one first radial beam to the inner portion and at least one second radial beam to the outer portion, wherein an axial stiffness of the polymer bearing support is greater than a radial stiffness of the polymer bearing support.

2. The polymer bearing support according to claim 1 wherein the polymer bearing support has a radial stiffness in the range from 50 to 500 N/mm.

3. The polymer bearing support according to claim 2 wherein the polymer bearing support has an axial stiffness greater than 300 N/mm.

4. The polymer bearing support according to claim 1 wherein the inner and/or outer portions are annular.

5. The polymer bearing support according to claim 1 wherein the flexible member has a thickness of from 0.1 mm to 1 mm.

6. The polymer bearing support according to claim 1 wherein the support comprises a polymer with a tensile modulus of less than 50 GPa.

7. The polymer bearing support according to claim 1 wherein the support comprises a polymer with a glass transition temperature ≥100° C.

8. The polymer bearing support according to claim 1 wherein the support is coupled to the housing and/or bearing using an interference fit.

9. The polymer bearing support according to claim 1 wherein the support is moulded, extruded, printed, machined, cast, spin cast, laser microjet machined or micro waterjet machined.

10. The polymer bearing support according to claim 1 wherein the support comprises polyether ether ketone (PEEK).

11. The vacuum pump comprising a rotor supported by a bearing arrangement, the bearing arrangement comprising a bearing supported in both radial and axial directions by a polymer support according to claim 1.

12. A polymer bearing support for use in the resilient support of a rotor bearing of a vacuum pump in both radial and axial directions, the bearing support comprising inner and outer annular portions and at least one intermediate annular portion joined to the inner annular portion by at least one first radial beam and joined to the outer annular portion by at least one second radial beam wherein an axial stiffness of the polymer bearing support is greater than a radial stiffness of the polymer bearing support.

13. A vacuum pump comprising a rotor supported by a bearing arrangement, the bearing arrangement comprising a bearing supported in both radial and axial directions by a resilient polymer support comprising inner and outer annular portions connected by at least one flexible member wherein said at least one flexible member is an elongate, arcuate member substantially concentric with the inner annular portion and outer annular portion and the flexible member is annular and joined by at least one first radial beam to the inner annular portion and at least one second radial beam to the outer annular portion, wherein an axial stiffness of the polymer bearing support is greater than a radial stiffness of the polymer bearing support.

14. A method of manufacturing a resilient polymer bearing support comprising the steps of moulding, extruding, printing or machining, casting, or spin casting a polymer to form the resilient polymer bearing support, the resilient polymer bearing support comprising an inner portion configured to be coupled to a bearing and an outer portion configured to be coupled to a housing of a vacuum pump, wherein the inner and outer portions are connected by at least one flexible member wherein said at least one flexible member is an elongate, arcuate member substantially concentric with the inner portion and outer portion and the flexible member is annular and joined by at least one first radial beam to the inner portion and at least one second radial beam to the outer portion, wherein an axial stiffness of the polymer bearing support is greater than a radial stiffness of the polymer bearing support.

* * * * *